(12) United States Patent
Haas et al.

(10) Patent No.: US 10,642,259 B2
(45) Date of Patent: May 5, 2020

(54) METHOD FOR OPERATING A CONTROL UNIT OF A MOTOR VEHICLE

(71) Applicant: Robert Bosch GmbH, Stuttgart (DE)

(72) Inventors: Michael Wilhelm Haas, Stuttgart (DE); Jochen Huber, Kanagawa (JP); Wolfgang Haag, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 51 days.

(21) Appl. No.: 15/775,885

(22) PCT Filed: Nov. 7, 2016

(86) PCT No.: PCT/EP2016/076795
§ 371 (c)(1),
(2) Date: May 14, 2018

(87) PCT Pub. No.: WO2017/080942
PCT Pub. Date: May 18, 2017

(65) Prior Publication Data
US 2018/0321669 A1  Nov. 8, 2018

(30) Foreign Application Priority Data
Nov. 13, 2015 (DE) .......... 10 2015 222 427

(51) Int. Cl.
*G05B 23/02* (2006.01)
*F02D 41/26* (2006.01)
(Continued)

(52) U.S. Cl.
CPC ......... *G05B 23/0262* (2013.01); *F02D 41/22* (2013.01); *F02D 41/2403* (2013.01);
(Continued)

(58) Field of Classification Search
CPC ........ G05B 23/0262; G05B 2219/2637; G05B 19/0428; G05B 23/0267; F02D 41/266;
(Continued)

(56) References Cited

U.S. PATENT DOCUMENTS

| | | | |
|---|---|---|---|
| 2003/0154762 A1* | 8/2003 | Haas .................. | G05B 19/0428 73/1.01 |
| 2007/0016340 A1* | 1/2007 | Soudier ................ | B60L 3/0084 701/1 |
| 2016/0193973 A1* | 7/2016 | Rupp .................... | B60L 3/0084 701/29.2 |

FOREIGN PATENT DOCUMENTS

| | | |
|---|---|---|
| DE | 4114999 A1 | 11/1992 |
| DE | 4438714 A1 | 5/1996 |

(Continued)

OTHER PUBLICATIONS

International Search Report dated Feb. 14, 2017, of the corresponding International Application PCT/EP2016/076795 filed Nov. 7, 2016.

*Primary Examiner* — Anne Marie Antonucci
(74) *Attorney, Agent, or Firm* — Norton Rose Fulbright US LLP; Gerard Messina

(57) ABSTRACT

A method for operating a control unit of a motor vehicle including a function unit and a monitoring unit which have a communication connection to one another. In a first check, the function unit is checked for errors, an error of the function unit being inferred if an error counter reaches a threshold value, and the monitoring unit and the function unit exchange first data with one another. In the event of a correct exchange of the first data, a positive change of the error counter is carried out. Otherwise, a negative change of the error counter is carried out. In a second check, the monitoring unit and the function unit exchange second data with one another. In the event of an incorrect exchange of the
(Continued)

second data, a negative change of the error counter and a negative change of the threshold value are carried out.

18 Claims, 1 Drawing Sheet

(51) Int. Cl.
*F02D 41/22* (2006.01)
*F02D 41/24* (2006.01)
*G06F 11/07* (2006.01)
*G05B 19/042* (2006.01)

(52) U.S. Cl.
CPC ....... *F02D 41/266* (2013.01); *G05B 19/0428* (2013.01); *G06F 11/076* (2013.01); *G06F 11/0739* (2013.01); *G05B 2219/2637* (2013.01); *G06F 2201/81* (2013.01)

(58) Field of Classification Search
CPC .... F02D 41/2403; F02D 41/22; G06F 11/076; G06F 11/0739; G06F 2201/81; G06F 11/0757
See application file for complete search history.

(56) References Cited

FOREIGN PATENT DOCUMENTS

| | | |
|---|---|---|
| DE | 10018859 A1 | 10/2001 |
| DE | 102008043646 A1 | 5/2010 |
| DE | 102008043648 A1 | 5/2010 |

\* cited by examiner

METHOD FOR OPERATING A CONTROL UNIT OF A MOTOR VEHICLE

FIELD

The present invention relates to a method for operating a control unit of a motor vehicle and a control unit of a motor vehicle and a computer program for carrying out the method.

BACKGROUND INFORMATION

In engine control units of internal combustion engines (gasoline and diesel), the torque-determining injections are controlled by a microcontroller as a processing unit. This activates a downstream activation circuit via its output port, in particular in the form of an application-specific integrated circuit (ASIC) including output stages (so-called injection output stage component), which in turn activates the injection valves (injectors), i.e., typically connects them in a defined manner to a power or voltage source.

Injection systems are among the safety-relevant systems for which a safety concept is advantageous. The safety concept may be represented, for example, by a multilevel concept. In safety-critical function units in vehicles, for example, in the electronic engine filling control system (EGAS), for example, a so-called three-level concept may be used for safety monitoring in the operating control unit. Mutual monitoring within the control unit between the function computer (processing unit, CPU) and a separate monitoring module (UM or watchdog) is essential. Function computer and monitoring module communicate via a question/answer communication and in the event of an error may shut down power output stages in the control unit, which are provided for operating the function unit, and thus ensure the safety of the vehicle. In present electronic engine filling control systems, the entire function and monitoring software is in a control unit, as described in German Patent No. DE 44 38 714 A1.

SUMMARY

According to the present invention, an example method for operating a control unit of a motor vehicle and an example control unit of the motor vehicle and an example computer program for carrying out the method are provided. Advantageous embodiments of the present invention are described herein.

The control unit includes a function unit and a monitoring unit. The function unit may be designed, for example, as a function module or a function computer for executing vehicle functions. The monitoring unit may be provided in particular for checking the function unit and for checking further units of the control unit. The function unit and the monitoring unit have a communication connection to one another, for example, via an SPI or MSC connection.

In the course of a first check, the function unit is checked for errors. An error of the function unit is inferred if an error counter reaches a threshold value. The function unit and the monitoring unit exchange first data with one another in the course of this first check. In the event of a correct exchange of the first data, a positive change of the error counter is carried out. In the event of an incorrect exchange of the first data, a negative change of the error counter is carried out. The error counter is stored in particular in the monitoring unit and is in particular changed thereby. It is to be noted that positive and negative are not to be understood as absolute counting directions, but rather merely as qualitative counting directions (negative: toward the threshold value; positive: away from the threshold value).

The error counter may be incremented, for example, by a specific value if an incorrect data exchange takes place. In the event of a correct data exchange, the error counter may also be decremented again by a specific value, for example, down to a minimal value of zero.

In the course of a second check, a so-called plausibility check, the monitoring unit and the function unit exchange second data with one another. In the course of this second check or plausibility check, the monitoring unit is checked in particular by the function unit. In the event of an incorrect exchange of the second data, a negative change of the error counter and a negative change of the threshold value are carried out.

In particular, the second data are intentionally exchanged incorrectly in the course of this second check, in order to provoke the correct error response, i.e., a negative change of the error counter by the monitoring unit, in order to thus be able to test the monitoring unit. In particular, an error of the monitoring unit may be inferred if the error counter is not changed as expected (i.e., not negatively) in this case. However, so as not to change the present distance between the error counter and the threshold value due to this intentional error, at the same time the threshold value is also changed. The threshold value may therefore in particular only be reached if the error counter is negatively changed in the course of the first check.

The threshold value is therefore not fixed at a constant value but rather is dynamically adapted. This thus compensates for the error counter being able to be changed both in the course of the first check and the second check. Preferably, in the event of a correct exchange of the first and/or the second data, a positive change of the error counter and a positive change of the threshold value are carried out, wherein the positive change of the threshold value is advantageously only carried out if the threshold value has not yet reached a threshold starting value (for example, three).

In conventional control units, a constant threshold value is permanently specified. This constant value is usually selected to be comparatively high to prevent the error counter from reaching the threshold value when the error counter is negatively changed in the course of the plausibility check and therefore an error of the function unit is incorrectly inferred. In different cases, it may take a shorter or longer time until an error of the function unit may be recognized, depending on whether the error counter is also changed in the course of the plausibility check. This results in different error response times, and therefore it is not possible to respond as quickly as possible to an error of the function unit.

In contrast thereto, the quickest possible error response time is enabled by the method and nonetheless sufficient debouncing is implemented. An error of the function unit may be recognized equally quickly in any situation, independently of whether the error counter is also changed in parallel by the plausibility check.

The threshold value may be changed in particular by the function unit and/or by the monitoring unit. The function unit may preferably change or specify the threshold value in the monitoring unit within a predefined framework, (for example, to the value 3, 4, 5). For this purpose, error counter and threshold value, which are each stored in particular in the monitoring unit, may be read out in particular by the function unit, in particular via an SPI or MSC connection.

Independent mutual monitoring of the function unit and the monitoring unit is implemented by the method. If one of the two units recognizes an error or defect of the other unit, the still functioning unit may respond to the defect of the other and initiate appropriate measures.

The portion of the second data which is transferred from the monitoring unit to the function unit (for example, questions) is advantageously the same data which are transferred as the portion of the first data from the monitoring unit to the function unit, and the monitoring unit is informed by the function unit, before, together with, or after the portion of the second data, which is transferred from the function unit to the monitoring unit (for example, answers), that it is an exchange of second data, in order to adjust the threshold value accordingly, or the function unit adjusts the threshold value via the data connection itself. The function unit thus decides here when a data exchange becomes an exchange of first data or an exchange of second data, i.e., the first and second data differ only by way of the portion which is transferred from the function unit to the monitoring unit (correct/unintentionally incorrect <-> intentionally incorrect).

The monitoring unit and the function unit advantageously exchange the first data with one another by the monitoring unit transmitting questions to the function unit and the function unit thereupon transmitting answers to the monitoring unit. In the event of a correct exchange of the first data, there is in particular no error of the function unit. The function unit preferably transmits answers at correct points in time in the event of a correct exchange of the first data. The function unit preferably transmits incorrect answers and/or answers at incorrect points in time in the event of an incorrect exchange of the first data. An incorrect answer or also a correct answer which was not sent at a correct point in time indicates an error of the function unit. After multiple incorrect answers or answers at incorrect points in time transmitted in succession, the error counter reaches the threshold value and in particular an error of the function unit is inferred.

Questions are preferably also transmitted from the monitoring unit to the function unit for the exchange of the second data. These are preferably the same questions as in the course of the data exchange of the first data. In order to check the monitoring unit, the function unit thereupon transmits intentionally incorrect answers and/or answers at incorrect points in time. If the monitoring unit functions correctly, the error counter is thereupon negatively changed. The function unit thereupon checks whether the error counter was negatively changed by the monitoring unit. If this is not the case, this indicates an error of the monitoring unit.

In the event of a correct exchange of the first data, in addition to the positive change of the error counter, a positive change of the threshold value is preferably also carried out. In this way, changes of the threshold value in response to an incorrect exchange of second data may be canceled out again. The threshold value is preferably only changed to a predefinable and/or predefined limiting value, which defines the typical error threshold for monitoring the function unit.

Alternatively or additionally, in the event of a correct exchange of the second data, a positive change of the error counter and a positive change of the threshold value are carried out. This specific embodiment is advantageous in particular if the first and second data differ with respect to their type, and not only by way of the answer (i.e., intentionally correct or intentionally incorrect) of the function unit.

The error counter and/or the threshold value are advantageously incremented or decremented in the event of a negative or positive change, respectively.

The error counter and/or the threshold value are preferably incremented by one or multiple increments in the event of a negative change. The severity of an error may be evaluated in particular by the number of the increments.

The threshold value may preferably only be increased in the event of intentionally incorrectly transmitted data and reduced in the event of correctly sent data, independently of the error counter change.

The error counter and/or the threshold value are preferably decremented by one or multiple decrements in the event of a positive change. In particular, the speed of the reset may be determined by the number of the decrements. In particular, the error counter may not be decremented to values less than zero.

A processing unit according to the present invention, for example, a control unit of a motor vehicle, is configured, in particular by programming, to carry out a method according to the present invention.

The implementation of the method in the form of a computer program is also advantageous, since this causes particularly low costs, in particular if an executing control unit is also used for further tasks and is therefore present anyway. Suitable data carriers for providing the computer program are in particular magnetic, optical, and electrical memories, for example, hard drives, flash memories, EEPROMs, DVDs, etc. A download of a program via computer networks (Internet, intranet, etc.) is also possible.

Further advantages and embodiments of the present invention result from the description herein and the figures.

The present invention is schematically shown in the figures on the basis of exemplary embodiments and are described hereafter with reference to the figures.

DETAILED DESCRIPTION OF EXAMPLE EMBODIMENTS

Figure 1:
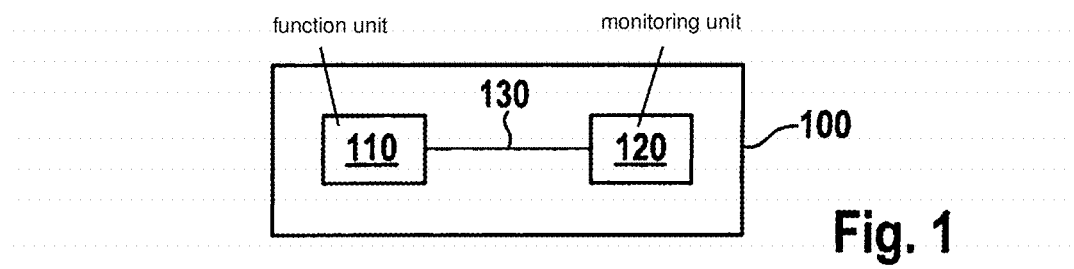
FIG. 1 schematically shows one preferred embodiment of a control unit according to the present invention of a motor vehicle, which is configured to carry out one preferred specific embodiment of a method according to the present invention.

FIG. 1 schematically shows a control unit 100 of a motor vehicle, for example, an engine control unit. Control unit 100 includes a function unit 110, for example, a so-called function computer, and a monitoring unit 120, for example, a so-called monitoring module. Control unit 100 is configured, in particular by programming, to carry out one preferred specific embodiment of a method according to the present invention.

Function unit 110 is configured, for example, in the course of an engine control, to carry out computing operations, for example, the determination of injection quantities and times (inter alia) and to activate connected components, for example, injectors, accordingly. Monitoring unit 120 is configured to check function unit 110 for errors. Function unit 110 and monitoring unit 120 have a communication connection for this purpose, for example, via an MSC connection 130.

In the course of a first check, the check of function unit 110, function unit 110 and monitoring unit 120 exchange first data with one another. For this purpose, monitoring unit 120 transmits questions to function unit 110. If function unit 110 operates correctly, it transmits a correct answer to the question at a correct point in time to monitoring unit 120. Function unit 110 and monitoring unit 120 therefore carry out a correct exchange of the first data.

In the event of an incorrect answer or also in the event of a correct answer at an incorrect point in time, function unit 110 and monitoring unit 120 exchange the first data incorrectly. In this case, an error counter is changed by monitoring unit 120, by incrementing the error counter by the value one. This increment of the error counter represents a negative change of the error counter.

If the following question is correctly answered again, the error counter is decremented by the value one again. This decrement of the error counter represents a positive change of the error counter. In the event of a correct exchange of the data, the error counter is decremented by the value one in each case until it has reached the value zero. The error counter may in particular not be set to values less than zero.

An error of function unit 110 is inferred if the error counter reaches a predefined and/or externally predefinable threshold value, for example, three. As a result, for example, the monitoring unit may shut down the power output stages of the function unit in the control unit and thus ensure the safety of the vehicle. Moreover, the possibility exists of resetting the function unit at another threshold value.

In the course of a second check, a so-called plausibility check, function unit 110 may carry out a check of monitoring unit 120. In the course thereof, function unit 110 and monitoring unit 120 exchange second data with one another. In particular, the data exchange of these second data takes place by function unit 110 intentionally transmitting an incorrect answer and/or an answer at an incorrect point in time to a question of monitoring unit 120 within the framework of the exchange of the first data. The exchange of second data is therefore characterized in that function unit 110 intentionally answers incorrectly. Due to this incorrect data exchange, the error counter is incremented by one or multiple increments, the increment being able to be equal in each case (for example, one) or dependent on the error (two in the case of delayed message, otherwise one). This increment of the error counter is expected in the course of the plausibility check. Function unit 110 thereupon checks whether monitoring unit 120 correctly increments the error counter. If the error counter is not correctly incremented, an error of monitoring unit 120 is inferred. As a result, for example, the function unit may shut down the power output stages in the control unit and thus ensure the safety of the vehicle. In addition, the function unit may resynchronize the communication with the monitoring unit in individual cases of error.

However, to avoid the error counter reaching the threshold value due to the exchange of second data and an error of the function unit incorrectly being assumed, or the present distance between error counter and threshold value being changed at all in the course of an intentional error, the threshold value is dynamically adapted and changed as a function of changes of the error counter in response to the exchange of the second data, as explained hereafter on the basis of FIG. 2.

In the example shown, the monitoring unit is configured to reduce the threshold value by the value one in each case in the event of a correct exchange of data, until it reaches a predefined or predefinable minimal value, for example, the value three. In this case, a differentiation is not made between first and second data in the event of a correct answer.

Figure 2A:
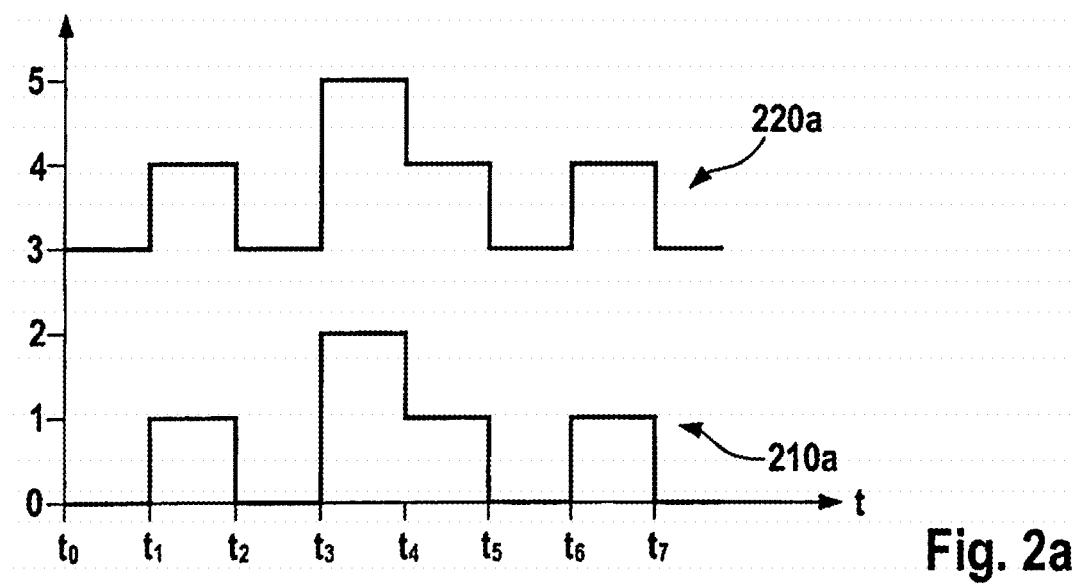
FIG. 2 schematically shows diagrams of an error counter and a threshold value plotted against time which may be determined in the course of one preferred specific embodiment of a method according to the present invention.
Figure 2B:
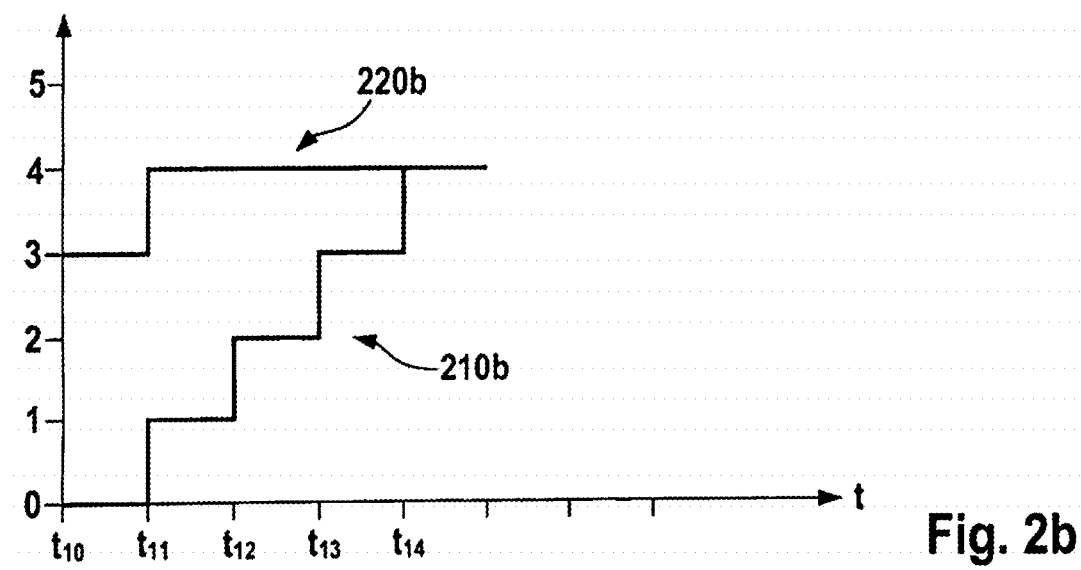

Two diagrams are schematically shown in FIG. 2, in each of which the error counter and the threshold value are plotted against time t. Graphs 210a and 210b each represent the error counter, graphs 220a and 220b each represent the threshold value. FIG. 2a shows a case in which monitoring unit 120 and function unit 110 function correctly. FIG. 2b shows a case in which function unit 110 does not function correctly.

In the correct case according to FIG. 2a, at a point in time $t_0$ the threshold value has the value three and the error counter has the value zero. A question is transmitted from monitoring unit 120 to function unit 110, which thereupon transmits a correct answer at the correct point in time to monitoring unit 120 at point in time $t_0$. The error counter would now actually be decremented by the value one, but since it is already zero, it may not be reduced further in this case. The threshold value would now actually also be reduced by the value one, but since it is already three, it may not be reduced further in this case.

Upon a further question of monitoring unit 120, function unit 110 transmits a correct answer in the course of the plausibility check, but intentionally at an excessively early point in time $t_1$ (and/or alternatively an incorrect answer). The error counter is thereupon incremented to the value one.

However, function unit 110 simultaneously reports to monitoring unit 120 that the incorrect answer was intentional. Thus, this involves the exchange of second data, so that the monitoring unit also increases the threshold value by one to the value four. It is therefore ensured that after a change of the error counter in response to the exchange of second data, the same distance prevails between error counter and threshold value before and after the change.

At a point in time $t_2$, function unit 110 again transmits a correct answer at the correct point in time upon a renewed question in the course of the first check. The error counter is again decremented by the value one. Similarly, the threshold value is also reduced by the value one to the value three.

Upon a further question of monitoring unit 120, function unit 110 again intentionally answers incorrectly in the course of the plausibility check. For example, an incorrect answer is transmitted at an excessively late point in time $t_3$. It may be provided that this double error results in an increment of the error counter by the value two to the value two. However, function unit 110 simultaneously reports to monitoring unit 120 that the incorrect answer was intentional. Thus, this involves the exchange of second data, so that monitoring unit also increases the threshold value by two to the value five.

At points in time $t_4$ and $t_5$, function unit 110 again answers correctly to questions of monitoring unit 120 in the course of the first check, whereupon at points in time $t_4$ and $t_5$, error counter and therefore also the threshold value are each decremented/reduced by one as expected.

At point in time $t_6$, function unit 110 intentionally answers with an incorrect answer at the correct point in time in the course of the plausibility check, whereupon the error counter is increased by one. Similarly, the threshold value is increased by one. At point in time $t_7$, function unit 110 again answers correctly, whereupon error counter and threshold value are again decremented/reduced by one.

According to the case of FIG. 2b, function unit 110 still operates correctly at first at a point in time $t_{10}$. The threshold value has the value three at point in time $t_{10}$, similarly to point in time $t_0$, and the error counter has the value zero. Function unit 110 answers correctly to a question of monitoring unit 120. At a point in time $t_{11}$, function unit 110 intentionally answers excessively early to a question, similarly to point in time $t_1$. Error counter and threshold value are thereupon incremented/increased by the value one.

At a point in time $t_{12}$, a defect or error of function unit 110 occurs. Function unit 110 unintentionally answers at point in time $t_{12}$ with an incorrect answer. Accordingly, function unit 110 also does not report to monitoring unit 120 that the incorrect answer was intentional. The error counter is therefore incremented by the value one upon the incorrect answer. However, the threshold value is not changed and remains at the value four.

At a point in time $t_{13}$, function unit 110 again unintentionally answers with an incorrect answer to a question of monitoring unit 120. The error counter is again incremented by one and the threshold value still remains at the value four.

Function unit 110 also answers unintentionally with an incorrect answer to a question at a point in time $t_{14}$ and the error counter is incremented by one and the threshold value still remains at the value four. The error counter now has the value four and has reached the threshold value. An error of function unit 110 is inferred and an error response may be carried out. For example, a so-called WDA line may be activated and a torque-relevant output stage may be shut down as an error response.

It may be ensured by the method that an error of function unit 110 is recognized, for example, after three successive incorrect answers. In conventional control units, in which a constant threshold value is often selected, this may not be ensured. For example, a constant threshold value of five may be reached more slowly or quickly in the event of an error of function unit 110, depending on which value the error counter was changed to by the plausibility check. If the error counter has the value two due to the plausibility check upon the occurrence of an error of function unit 110, for example, this error will also be recognized after three successive incorrect answers. However, if the error counter has the value zero upon the occurrence of the error, for example, this error will only be recognized after five successive incorrect answers. In contrast thereto, the quickest possible recognition of an error of function unit 110 is enabled by the method.

What is claimed is:

1. A method for operating a control unit of a motor vehicle including a function unit and a monitoring unit, which have a communication connection to one another, the method comprising:
   in a first check, checking the function unit for errors, an error of the function unit is inferred if an error counter reaches a threshold value, and in the first check, the monitoring unit and the function unit exchanging first data with one another, wherein in the event of a correct exchange of the first data, a positive change of the error counter is carried out, and in the event of an incorrect exchange of the first data, a negative change of the error counter is carried out; and
   in a second plausibility check, the monitoring unit and the function unit exchanging second data with one another, wherein during the exchanging in the second plausibility check, the function unit intentionally exchanging the second data incorrectly with the monitoring unit, wherein in the second plausibility check: (i) when the monitoring unit detects the incorrect exchange of the second data, the negative change of the error counter and a negative change of the threshold value are carried out, and (ii) when the event the monitoring unit does not detect the incorrect exchange of the second data, an error in the monitoring unit is inferred.

2. The method as recited in claim 1, wherein, in the event of the correct exchange of at least one of the first data and the second data, the positive change of the error counter and a positive change of the threshold value are carried out.

3. The method as recited in claim 2, wherein the positive change of the threshold value is carried out only if the threshold value has not yet reached a threshold starting value.

4. The method as recited in claim 1, wherein the monitoring unit and the function unit exchange the first data with one another in that the monitoring unit transmits questions to the function unit and the function unit thereupon transmits answers to the monitoring unit.

5. The method as recited in claim 4, wherein at least one of: (i) the exchange of the first data is incorrect if the function unit at least one of: transmits incorrect answers, and transmits answers at incorrect points in time, and (b) the exchange of the first data is correct if the function unit transmits correct answers at correct points in time.

6. The method as recited in claim 1, wherein the monitoring unit and the function unit exchange the second data with one another in that the monitoring unit transmits questions to the function unit and the function unit thereupon transmits answers to the monitoring unit.

7. The method as recited in claim 6, wherein the exchange of the second data is incorrect if the function unit transmits one of incorrect answers, and answers at incorrect points in time.

8. The method as recited in claim 1, wherein at least one of the error counter and the threshold value are decremented by one or multiple decrements, in the course of the positive change.

9. The method as recited in claim 1, wherein at least one of the error counter and the threshold value are incremented by one or multiple increments in the course of the negative change.

10. The method as recited in claim 1, wherein the function unit determines when first data are exchanged and when second data are exchanged.

11. The method as recited in claim 1, wherein the monitoring unit specifies a fixed time window, using which points in time of the received data are checked for plausibility.

12. The method as recited in claim 1, wherein the function unit provides information to the monitoring unit of whether the negative change of the threshold value has to be carried out.

13. The method as recited in claim 1, wherein the function unit specifies a specific threshold value to the monitoring unit.

14. The method as recited in claim 1, wherein in the second plausibility check: (i) the function unit also reports to the monitoring unit that the incorrect exchange of the second data by the function unit was intentional, and (ii) the negative change of the threshold value is carried out by the monitoring unit.

15. A processing unit, which is configured to operate a control unit of a motor vehicle including a function unit and a monitoring unit, which have a communication connection to one another, the processing unit configured to:
   in a first check, check the function unit for errors, an error of the function unit is inferred if an error counter reaches a threshold value, and in the first check, the monitoring unit and the function unit exchange first data with one another, wherein in the event of a correct exchange of the first data, a positive change of the error counter is carried out, and in the event of an incorrect exchange of the first data, a negative change of the error counter is carried out; and in a second plausibility check, the monitoring unit and the function unit exchange second data with one another, wherein during the exchange in the second plausibility check, the function unit intentionally exchanges the second data incorrectly with the monitoring unit, wherein in the second plausibility check, (i) in the event the monitoring unit detects the incorrect exchange of the second data, the negative change of the error counter and a negative change of the threshold value are carried out, and (ii) in the event the monitoring unit does not detect the incorrect exchange of the second data, a error in the monitoring unit is inferred.

16. The processing unit as recited in claim 15, wherein in the second plausibility check: (i) the function unit also reports to the monitoring unit that the incorrect exchange of the second data by the function unit was intentional, and (ii) the negative change of the threshold value is carried out by the monitoring unit.

17. A non-transitory machine-readable storage on which is stored a computer program for operating a control unit of a motor vehicle including a function unit and a monitoring unit, which have a communication connection to one another, the computer program, when executed by a processor, causing the processor to perform:

in a first check, checking the function unit for errors, an error of the function unit is inferred if an error counter reaches a threshold value, and in the first check, the monitoring unit and the function unit exchanging first data with one another, wherein in the event of a correct exchange of the first data, a positive change of the error counter is carried out, and in the event of an incorrect exchange of the first data, a negative change of the error counter is carried out; and in a second plausibility check, the monitoring unit and the function unit exchanging second data with one another, wherein during the exchanging in the second plausibility check, the function unit intentionally exchanging the second data incorrectly with the monitoring unit, wherein in the second plausibility check: (i) when the monitoring unit detects the incorrect exchange of the second data, the negative change of the error counter and a negative change of the threshold value are carried out, and (ii) when the event the monitoring unit does not detect the incorrect exchange of the second data, an error in the monitoring unit is inferred.

18. The non-transitory machine-readable storage as recited in claim 17, wherein in the second plausibility check: (i) the function unit also reports to the monitoring unit that the incorrect exchange of the second data by the function unit was intentional, and (ii) the negative change of the threshold value is carried out by the monitoring unit.

* * * * *